United States Patent [19]
Ikeda

[11] Patent Number: 5,161,097
[45] Date of Patent: Nov. 3, 1992

[54] ELECTRIC POWER UNIT
[75] Inventor: Osamu Ikeda, Tokyo, Japan
[73] Assignee: Dia Semicon Systems Incorporated, Tokyo, Japan
[21] Appl. No.: 854,235
[22] Filed: Mar. 20, 1992
[30] Foreign Application Priority Data
Nov. 12, 1991 [JP] Japan .................. 3-322369
[51] Int. Cl.⁵ .......................... H02M 3/335
[52] U.S. Cl. .................. 363/124; 323/222; 323/299
[58] Field of Search ............. 363/124; 323/222, 299
[56] References Cited
U.S. PATENT DOCUMENTS
4,823,247  4/1989  Tamoto .................. 363/124 X

*Primary Examiner*—Emanuel T. Voeltz
*Attorney, Agent, or Firm*—Barnes & Thornburg

[57] ABSTRACT

The electric power unit of the present invention for a battery-powered electronic appliance comprises a chopper-controlled nonisolated DC-DC converter for converting the output voltage of a battery into required voltage, a bypass switch for bypassing the DC-DC converter, a comparator for comparing the output voltage of the battery with a reference voltage corresponding to the required voltage of the load circuit, and a controller for controlling the bypass switch on the basis of the output signal of the comparator. When the output voltage of the battery is higher than the reference voltage, the battery is connected directly to the load circuit, so that the power of the battery can be supplied to the load circuit without loss due to the operation of the DC-DC converter. When the output voltage is lower than the reference voltage, the output voltage of the battery is converted into a voltage nearly equal to the required voltage of the load circuit by the DC-DC converter, so that substantially all the energy stored in the battery can effectively be used.

4 Claims, 2 Drawing Sheets

ELECTRIC POWER UNIT

BACKGROUND OF THE INVENTION

1. Field of the Invention

The present invention relates to an electric power unit for supplying the output power of a battery to a load circuit through a chopper-controlled nonisolated DC-DC converter (hereinafter referred to simply as "DC-DC converter") and, more particularly, to an electric power unit capable of supplying the energy stored in a battery to a load circuit at the least possible loss of energy.

2. Description of the Prior Art

Recent cordless electronic appliances, such as portable computers, portable word processors, portable VTRs and portable video cameras, are provided with a built-in electric power unit comprising a battery, such as a nickel-cadmium secondary battery, and a DC-DC converter for converting and stabilizing the output voltage of the battery. Generally, the battery comprises a plurality of cells connected in series, and the output voltage of the battery is converted into a voltage required by the load circuit by the DC-DC converter.

In designing a battery-powered electronic appliance provided with an electric power unit, it is a very important technical problem to extend the continuous duty time, namely, a time period in which the battery-powered electronic appliance is able to operate without recharging the battery or without changing the battery, under limited conditions for the dimensions and weight of the battery-powered electronic appliance. Accordingly, many studies have been made to increase the energy density of the battery and to reduce the power consumption of the circuit. As is well known, power loss in the chopper-controlled DC-DC converter, i.e., a switching regulator, is far less than that in the conventional series regulator and hence the chopper-controlled DC-DC converter is recently applied to many electronic appliances. However, the power loss even in the chopper-controlled nonisolated DC-DC converter is in the range of 20 to 25%, which is significantly large in view of further reducing the power consumption of the electronic appliance, and the electric power unit itself has a significant cause of reducing the continuous duty time of the battery-powered electronic appliance.

If the number of series-connected cells of an electric power supply is determined selectively so as to meet the required voltage of the load circuit, the DC-DC converter may be omitted. Some battery-powered electronic appliances are provided with such an electric power unit. In designing such an electric power unit for a battery-powered electronic appliance, the number of series-connected cells of the battery is determined so that the sum of the voltage of the cells in the stable discharge period in the discharge characteristic curve, i.e., the nominal voltage, coincides with the required voltage of the load circuit of the battery-powered electronic appliance. The output voltage of the battery decreases gradually as the battery is discharged, and warning is given to prompt the operator to stop the use of the appliance, or the electric power unit is disconnected automatically to prevent the malfunction of the load circuit, upon the drop of the output voltage below a threshold value. That is, the final discharge voltage of the battery is set for a voltage slightly higher than a voltage below which the load circuit is unable to function normally, and the discharge of the battery is stopped upon the decrease of the output voltage of the battery below the final discharge voltage. As is well known, the output voltage of the battery, in general, gradually decreases as the battery is discharged. Even if the discharge of the battery is stopped upon the decrease of the output voltage below a certain final discharge voltage, the battery is not completely exhausted; a considerable amount of energy still remains in the battery. Accordingly, the electric power unit not employing a DC-DC converter is unable to use the residual energy remaining in the battery after the output voltage has dropped below the final discharge voltage, so that the continuous duty time of the electronic appliance is diminished.

SUMMARY OF THE INVENTION

Accordingly, it is an object of the present invention to provide an electric power unit capable of fully using the energy of a battery to extend the continuous duty time of an associated battery-powered electronic appliance.

In one aspect of the present invention, an electric power unit comprises: a battery; a chopper-controlled nonisolated DC-DC converter (hereinafter referred to simply as "DC-DC converter") having input terminals connected to the battery and output terminals connected to a load circuit; a bypass switch for connecting the input terminals of the DC-DC converter to the output terminals of the same to apply the output of the battery directly to the load circuit; a comparing means for comparing the input voltage of the DC-DC converter and a reference voltage to see if the input voltage is higher than a lower limit voltage (threshold voltage) determined on the basis of the required voltage of the load circuit; and a control means for stopping the operation of the DC-DC converter and closing the bypass switch to bypass the DC-DC converter when the input voltage of the DC-DC converter is higher than the lower limit voltage, and for making the DC-DC converter operative and opening the bypass switch when the input voltage of the DC-DC converter is lower than the lower limit voltage.

The electric power unit applies the output voltage of the battery directly to the load circuit, with the DC-DC converter held inoperative, when the output voltage of the battery is higher than the lower limit voltage corresponding to the required voltage of the load circuit, and opens the bypass switch to make the DC-DC converter operative to convert the output voltage of the battery into a voltage nearly equal to the required voltage when the output voltage of the battery is lower than the lower limit voltage. Thus, the electric power unit is able to operate at a high efficiency while the output voltage of the battery is higher than the lower limit voltage because power loss due to the operation of the DC-DC converter is avoided, and the electric power unit is able to use all the energy stored in the battery effectively because the output voltage of the electric power unit is stabilized by the DC-DC converter after the output voltage of the battery has dropped below the lower limit voltage. Consequently, the continuous duty time of a battery-powered electronic appliance employing the electric power unit of the present invention is extended.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENT

Figure 1:
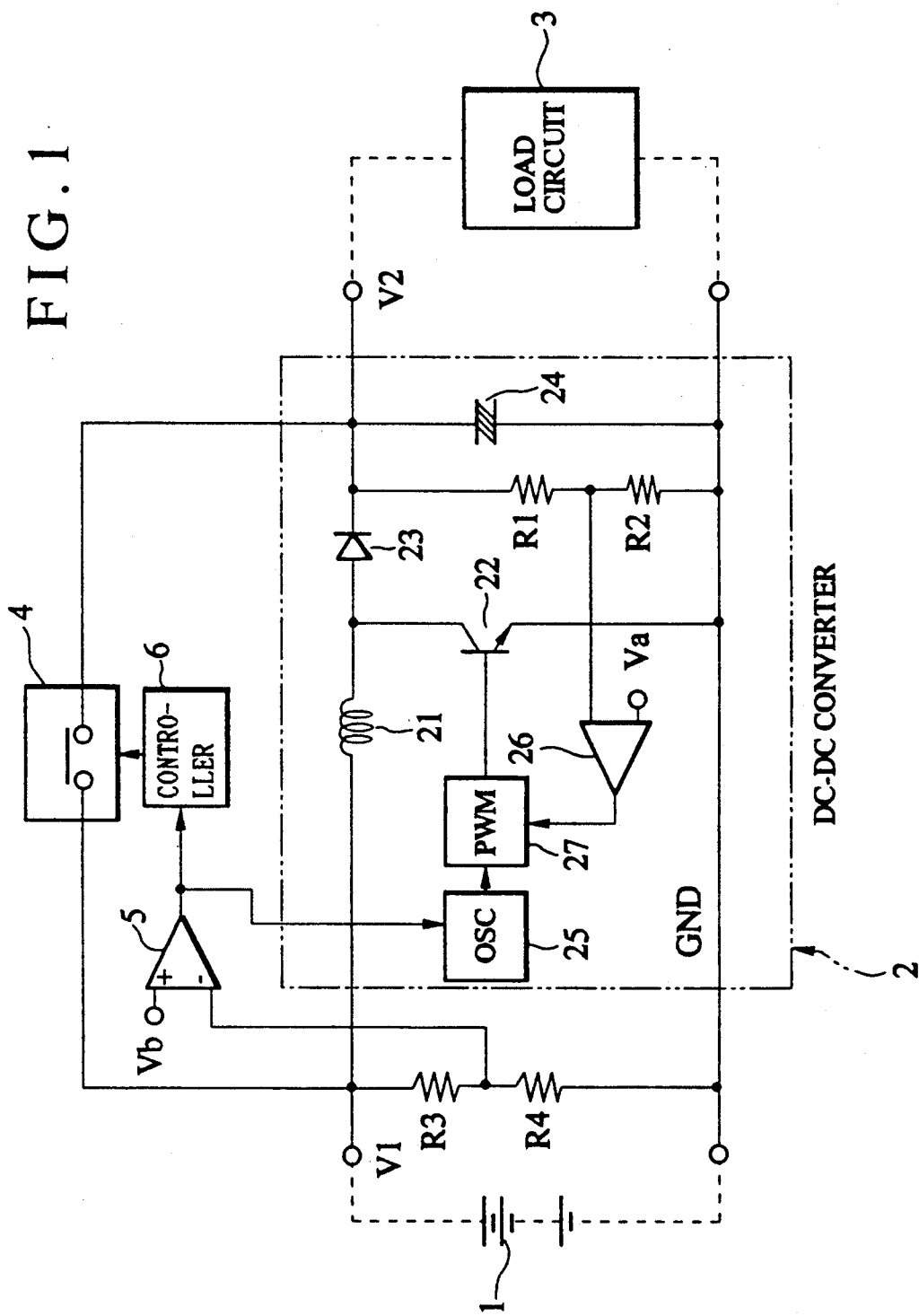
FIG. 1 is a circuit diagram of an electric power unit in a preferred embodiment according to the present invention.
Figure 2:
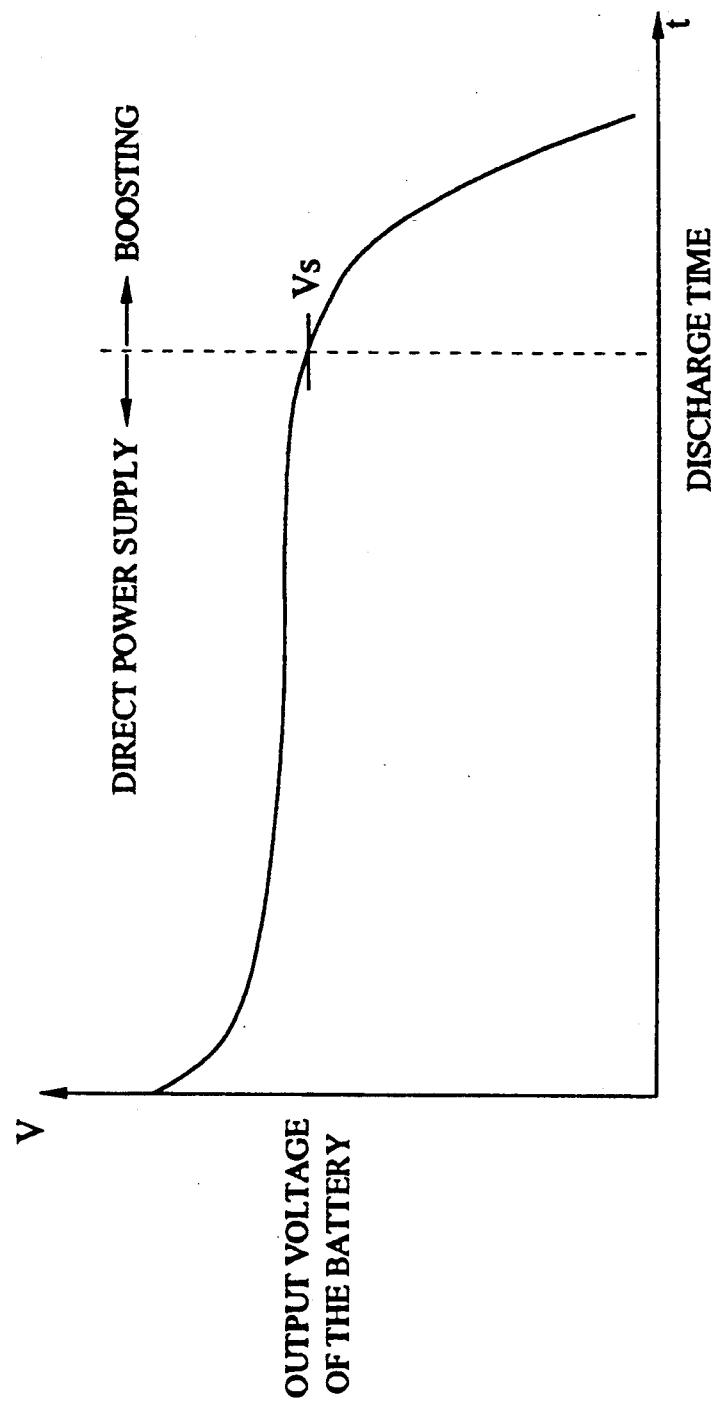
FIG. 2 is a graph showing the discharge characteristic curve of a battery, for assistance in explaining the operation of the electric power unit of FIG. 1.

An electric power unit in a preferred embodiment according to the present invention shown in FIG. 1 supplies the output of a battery 1 through a chopper-controlled nonisolated DC-DC converter 2 of a booster type (hereinafter referred to simply as "DC-DC converter") to a load circuit 3. The electric power unit is provided with a latching relay 4 (bypass switch) for directly connecting the input terminal of the DC-DC converter to the output terminal of the same to apply the output of the battery 1 directly to the load circuit 3. The latching relay 4 has mechanical contacts which are maintained in the last position assumed. As shown in FIG. 2, the DC-DC converter 2 is held inoperative and the latching relay 4 is set to an ON state in the initial discharge period and the middle discharge period in which the output voltage of the battery 1 is higher than a reference voltage Vs slightly lower than the nominal voltage of the battery 1 to apply the output of the battery 1 directly to the load circuit 3. In the final discharge period in which the output voltage of the battery 1 is lower than the reference voltage Vs, the DC-DC converter 2 is made operative and the latching relay 4 is set to an OFF state to convert the output voltage of the battery 1 into an output voltage nearly equal to the nominal voltage and to apply the increased output voltage to the load circuit 3.

The DC-DC converter 2 has a well-known circuit called a boosting chopper circuit. The DC-DC converter 2 has a transistor 22, a pulse width modulator 27 for driving the transistor 22 for on-off operation at a high frequency, an inductor 21 connected in series between the input terminals with the transistor 22, and a series combination of a diode 23 and a capacitor 24 connected between the emitter and collector of the transistor 22 so that a current flows through the inductor 21 when the transistor 22 is turned off. The capacitor 24 is of a relatively large capacity. A smoothed, stabilized DC voltage V2 appears across the electrodes of the capacitor 24. The voltage V2 is detected through voltage dividing resistors R1 and R2. An error amplifier 26 detects and amplifies the deviation of the Voltage V2 from a required voltage. A high-frequency pulse signal provided by an oscillator 25 is applied to the pulse width modulator 27, and the output signal of the error amplifier 26 is used as a modulating signal for modulating the high-frequency pulse signal provided by the oscillator 25. The on-state duration time ratio of the transistor 22 is controlled by the output signal of the error amplifier 26 for the feedback control of the voltage V2 to maintain the voltage V2 nearly equal to the required voltage.

The output voltage V1 of the battery 1 is detected through voltage dividing resistors R3 and R4, and is compared with a reference voltage Vb corresponding to the reference voltage Vs shown in FIG. 2 by a comparator 5. If the output voltage V1 of the battery 1 is higher than the reference voltage Vb, the output signal of the comparator 5 goes HIGH. If the output voltage V1 of the battery 1 is lower than the reference voltage Vb, the output signal of the comparator 5 goes LOW. The oscillator 25 of the DC-DC converter 2 is controlled by the output signal of the comparator 5. When the output signal of the comparator 5 is HIGH, the oscillator 25 is stopped and the transistor 22 is turned off to hold the DC-DC converter 2 inoperative.

The output signal of the comparator 5 is used also as a control signal for controlling the latching relay 4, i.e., a bypass switch. When the output signal of the comparator 5 is HIGH, a relay controller 6 sets the latching relay 4 to an ON state, and sets the latching relay 4 to an OFF state when the output signal of the comparator 5 is LOW. Thus, the latching relay 4 is set to an ON-state while the output voltage V1 of the battery 1 is higher than the reference voltage Vs to connect the battery 1 directly to the load circuit 3, so that the power of the battery 1 can be supplied to the load circuit 3 without loss.

It is also possible to employ a DC-DC converter of a stepping-down type to convert the output voltage of the battery into a required voltage while the output voltage of the battery is excessively high in the initial discharge period and to connect the battery directly to the load circuit after the output voltage of the battery has dropped to an appropriate level.

As is apparent from the foregoing description, the electric power unit holds its DC-DC converter inoperative and supplies power directly from the battery to the load circuit while the output voltage is higher than the reference voltage to supply power without loss attributable to the operation of the DC-DC converter, and converts the output voltage of the battery into a voltage nearly equal to the reference voltage by the DC-DC converter after the output voltage has dropped below the reference voltage to use substantially all the energy stored in the battery. Accordingly, the electric power unit extends the continuous duty time of the associated battery-powered electronic appliance.

Although the invention has been described in its preferred form with a certain degree of particularity, obviously many changes and variations are possible therein.

It is therefore to be understood that the present invention may be practiced otherwise than as specifically described herein without departing from the scope and spirit thereof.

What is claimed is:

1. An electric power unit for supplying power to a battery-powered load circuit, comprising:
   a chopper-controlled nonisolated DC-DC converter for converting the output voltage of a battery into a required voltage;
   a bypass switch for bypassing the chopper-controlled nonisolated DC-DC converter to connect the battery directly to the load circuit;
   a comparing means for comparing the output voltage of the battery with a threshold voltage to see if the output voltage of the battery is higher than the threshold voltage; and
   a control means for controlling the bypass switch on the basis of the output signal of the comparing means to hold the chopper-controlled nonisolated DC-DC converter inoperative by closing the bypass switch so that the battery is connected directly to the load circuit and to make the chopper-controlled nonisolated DC-DC converter operative by opening the bypass switch so that the output power of the battery is supplied through the chopper-controlled nonisolated DC-DC converter to the load circuit.

2. An electric power unit as claimed in claim 1, wherein said chopper-controlled nonisolated DC-DC converter includes a boosting chopper circuit.

3. An electric power unit as claimed in claim 1, wherein said bypass switch is a latching relay.

4. An electric power unit as claimed in claim 1, wherein said comparing means comprises dividing resistors for detecting the output voltage of the battery, and a comparator for comparing the output voltage of the battery with the threshold voltage.

* * * * *